United States Patent
Ogawa et al.

(10) Patent No.: US 12,085,776 B2
(45) Date of Patent: Sep. 10, 2024

(54) APPARATUS AND SYSTEM

(71) Applicant: CANON KABUSHIKI KAISHA, Tokyo (JP)

(72) Inventors: Toshihiro Ogawa, Tokyo (JP); Mitsuhiro Izumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

(21) Appl. No.: 17/166,871

(22) Filed: Feb. 3, 2021

(65) Prior Publication Data
US 2021/0255415 A1    Aug. 19, 2021

(30) Foreign Application Priority Data
Feb. 17, 2020   (JP) .................................. 2020-024749

(51) Int. Cl.
| G02B 7/04 | (2021.01) |
| G03B 13/36 | (2021.01) |
| G03B 17/14 | (2021.01) |

(52) U.S. Cl.
CPC .............. *G02B 7/04* (2013.01); *G03B 13/36* (2013.01); *G03B 17/14* (2013.01)

(58) Field of Classification Search
CPC . G02B 7/09; G02B 7/04; G02B 17/14; G02B 7/02; G03B 5/00; G03B 2205/0046; G03B 3/10; G03B 13/36; G03B 17/12; G03B 2205/0061; G03B 17/14; G03B 9/06; G03B 17/02; H02N 2/001; H02N 2/0085; H02N 2/163
USPC .......................................... 359/822–830, 694
See application file for complete search history.

(56) References Cited

U.S. PATENT DOCUMENTS

| 6,724,541 B2 * | 4/2004 | Noguchi ................ G02B 7/102 359/701 |
| 8,248,722 B2 * | 8/2012 | Hattori .................... G03B 17/14 359/827 |
| 9,846,293 B2 * | 12/2017 | Hasegawa .............. G02B 7/025 |
| 2007/0195430 A1 * | 8/2007 | Koyama ................... G03B 5/00 359/703 |
| 2011/0141588 A1 * | 6/2011 | Lai ........................ G02B 27/64 359/824 |
| 2015/0092282 A1 * | 4/2015 | Niiyama .................. G03B 5/00 359/700 |

FOREIGN PATENT DOCUMENTS

| JP | 2013238760 A | 11/2013 |
| WO | 2007010813 A1 | 1/2007 |

* cited by examiner

*Primary Examiner* — Jie Lei
*Assistant Examiner* — Kuei-Jen L Edenfield
(74) *Attorney, Agent, or Firm* — Canon U.S.A., Inc. IP Division

(57) ABSTRACT

An apparatus includes a lens, a cam barrel configured to rotate around an optical axis, an actuator disposed on an inner peripheral side of the cam barrel, a movement unit disposed on the inner peripheral side of the cam barrel and configured to move the lens in an optical-axis direction, and an adjustment unit disposed on the inner peripheral side of the cam barrel and configured to adjust a position of the lens. The movement unit, the adjustment unit, and the actuator are arranged at different phases from one another in a circumferential direction of the cam barrel. Widths of the movement unit, the adjustment unit, and the actuator in the optical-axis direction overlap one another.

20 Claims, 9 Drawing Sheets

APPARATUS AND SYSTEM

BACKGROUND OF THE DISCLOSURE

Field of the Disclosure

The aspect of the embodiments relates to an optical apparatus including a mechanism for adjusting a lens that moves.

Description of the Related Art

Some of optical apparatuses, such as digital cameras, video cameras, and interchangeable lenses accompanying them, move a focus component forward and backward by transmitting a driving force of an actuator to a cam barrel with the aid of an action of a speed reduction gear and guiding a movement roller fitted in a cam groove in an optical-axis direction. Japanese Patent Application Laid-Open No. 2013-238760 discusses a configuration that realizes a reduction in the entire length of a product by forming a cutout to the focus component and allowing the actuator to be held in the cutout when retracting the focus component. Further, the configuration discussed in Japanese Patent Application Laid-Open No. 2013-238760 allows the positions of a part of lenses in the focus component to be adjusted by disposing adjustment rollers inside the focus component.

However, forming the cutout like the above-described example undesirably leads to a reduction in rigidity of the focus component. Therefore, when a moment is generated due to an external force, the focus component may be tilted or distorted.

SUMMARY OF THE DISCLOSURE

According to an aspect of the embodiments, an apparatus includes a lens, a cam barrel configured to rotate around an optical axis, an actuator disposed on an inner peripheral side of the cam barrel, a movement unit disposed on the inner peripheral side of the cam barrel and configured to move the lens in an optical-axis direction, and an adjustment unit disposed on the inner peripheral side of the cam barrel and configured to adjust a position of the lens. The movement unit, the adjustment unit, and the actuator are arranged at different phases from one another in a circumferential direction of the cam barrel. Widths of the movement unit, the adjustment unit, and the actuator in the optical-axis direction overlap one another.

Further features of the disclosure will become apparent from the following description of exemplary embodiments with reference to the attached drawings.

DESCRIPTION OF THE EMBODIMENTS

In the following description, an exemplary embodiment of the disclosure will be described in detail with reference to the attached drawings. The present exemplary embodiment will be described regarding an interchangeable lens, which is an example of an optical apparatus, but, besides it, the disclosure can be modified and changed in various manners within the scope of the spirit thereof, such as being applied to a lens-integrated camera.

Figure 1A:
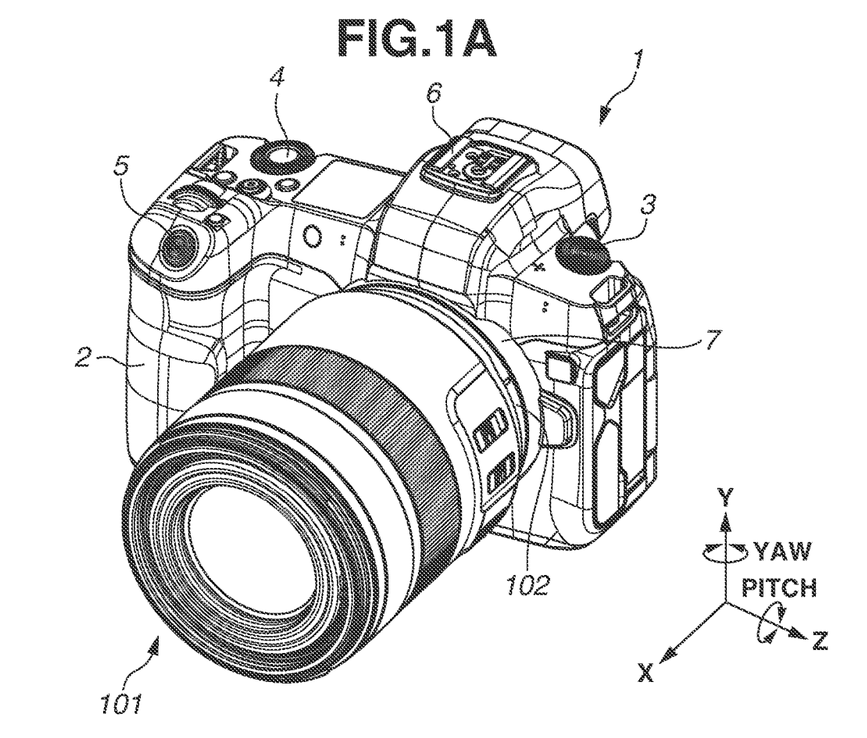
FIG. 1A is a front perspective view of an interchangeable lens and a digital camera according to an exemplary embodiment of the disclosure.
Figure 1B:
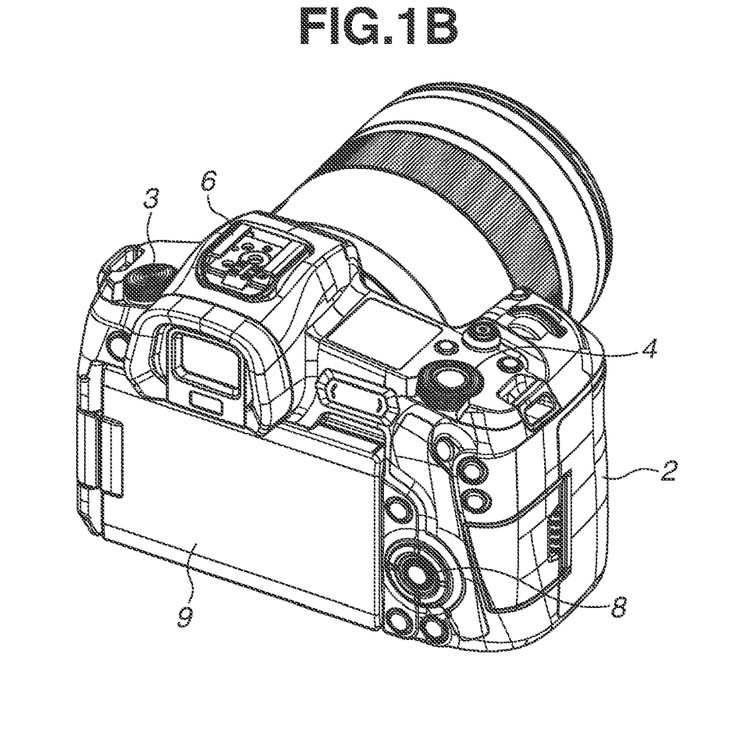
FIG. 1B is a back perspective view thereof.

FIGS. 1A and 1B are a front perspective view and a back perspective view of an interchangeable lens and a digital camera according to the present exemplary embodiment, respectively. An interchangeable lens 101 is detachably mounted on a digital camera 1 (hereinafter referred to as a camera main body 1) serving as an imaging apparatus. FIG. 1A is a perspective view illustrating front sides of the interchangeable lens 101 and the camera main body 1, and FIG. 1B is a perspective view illustrating back sides of the interchangeable lens 101 and the camera main body 1. As illustrated in FIG. 1A, an X-axis direction is defined to be an optical-axis direction in which an optical axis of an imaging optical system held in the interchangeable lens 101 extends, and a Z-axis direction (a horizontal direction) and a Y-axis direction (a vertical direction) are defined to be directions perpendicular thereto. Hereinafter, the Z-axis direction and the Y-axis direction will also be collectively referred to as Z/Y-axis directions. Further, a pitch direction is defined to be a rotational direction around the Z axis, and a yaw direction is defined to be a rotational direction around the Y axis. The pitch direction and the yaw direction (hereinafter will also be collectively referred to as pitch/yaw directions) are rotational directions around the two axes that are the Z axis and the Y axis perpendicular to each other.

A grip unit 2, which is used for a user to hold the camera main body 1 with his/her hand, is provided at a portion on a left side as viewed from a front side of the camera main body 1 (a subject side) (a portion on a right side as viewed from the back side). A power supply operation unit 3 is disposed on a top portion of the camera main body 1. When the user operates the power supply operation unit 3 to turn it on while the camera main body 1 is in a powered-off state, the camera main body 1 is brought into a powered-on state and becomes ready to capture an image. Further, when the user operates the power supply operation unit 3 to turn it off while the camera main body 1 is in the powered-on state, the camera main body 1 is brought into the powered-off state.

A mode dial 4, a release button 5, and an accessory shoe 6 are further provided on the top side of the camera main body 1. The user can switch an imaging mode by rotationally operating the mode dial 4. Examples of the imaging mode include a manual still image capturing mode, in which the user can arbitrarily set imaging conditions such as a shutter speed and an aperture value, an automatic still image capturing mode, in which an appropriate exposure amount can be automatically acquired, and a moving image capturing mode, in which a moving image can be captured. The user can issue an instruction for an imaging preparation operation such as automatic focusing and automatic exposure control by performing a half-pressing operation of the release button 5, and can issue an instruction for imaging by performing a full-pressing operation of the release button 5. An accessory, such as an external flash, is detachably mounted on the accessory shoe 6. The camera main body 1 includes therein an image sensor that photoelectrically converts a subject image formed by the imaging optical system in the interchangeable lens 101.

As illustrated in FIG. 1B, a back-side operation unit 8 and a display unit 9 are provided on the back side of the camera main body 1. The back-side operation unit 8 includes a plurality of buttons and a dial assigned to various functions. When the camera main body 1 is in the powered-on state and the imaging mode is set to the still image capturing mode or the moving image capturing mode, a subject image captured by the image sensor is displayed on the display unit 9 as a through-the-lens image. Further, imaging parameters indicating the imaging conditions such as the shutter speed and the aperture value are displayed on the display unit 9, and the user can change setting values of the imaging parameters by operating the back-side operation unit 8 while viewing this display. The back-side operation unit 8 includes a playback button for issuing an instruction to play back a recorded captured image, and a playback display of the captured image is presented on the display unit 9 by the user's operating the playback button.

Figure 2:
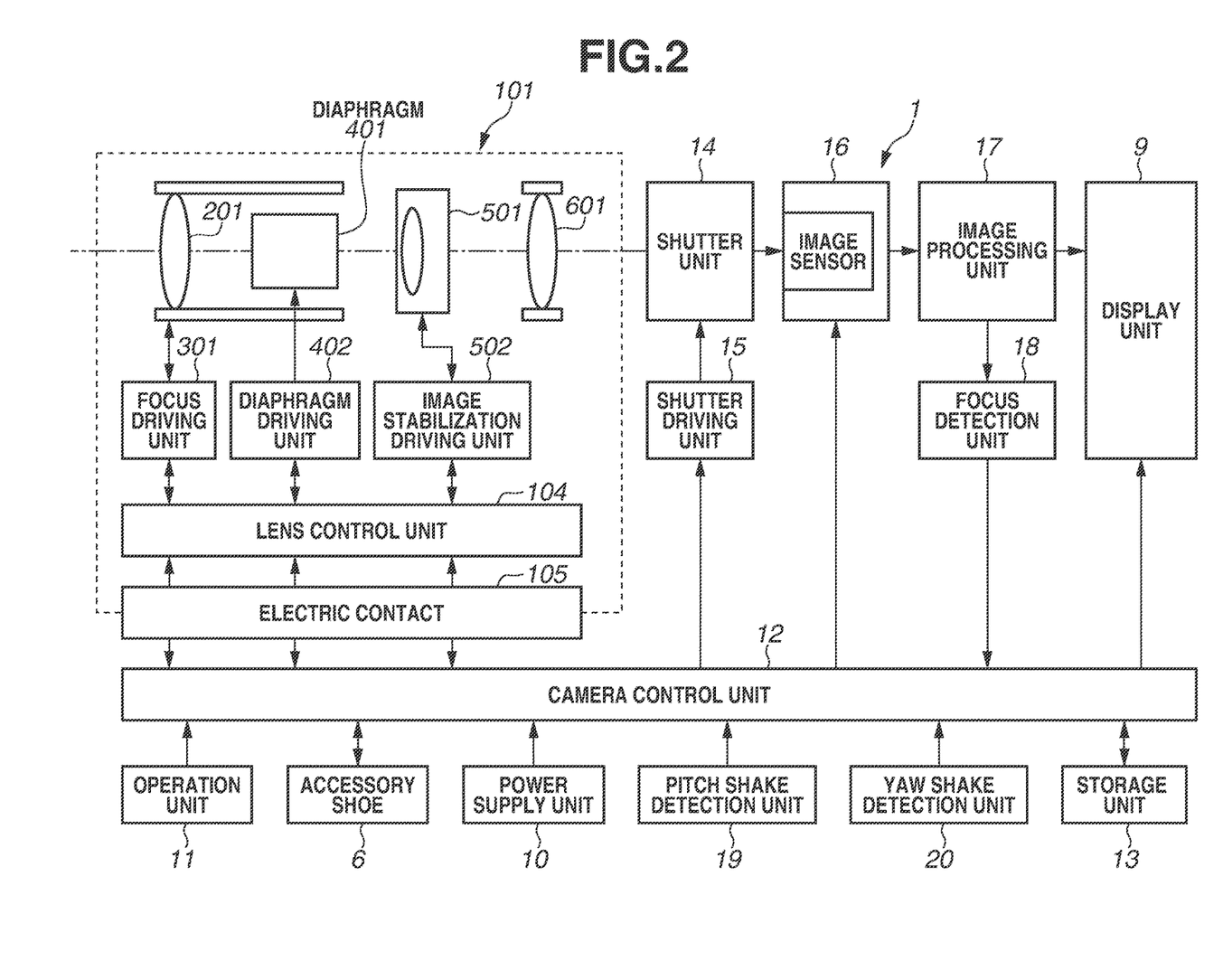
FIG. 2 is a block diagram illustrating electric and optical configurations of the interchangeable lens and a camera main body according to the exemplary embodiment of the disclosure.

FIG. 2 is a block diagram illustrating electric and optical configurations of the interchangeable lens 101 and the camera main body 1 according to the present exemplary embodiment. The camera main body 1 includes a power supply unit 10, which supplies power to the camera main body 1 and the interchangeable lens 101, and an operation unit 11, which includes the above-described power supply operation unit 3, mode dial 4, release button 5, and back-side operation unit 8, and a touch panel function of the above-described display unit 9. A camera control unit 12 provided to the camera main body 1 and a lens control unit 104 provided to the interchangeable lens 101 cooperate with each other, by which the camera main body 1 and the interchangeable lens 101 are controlled as a whole system. The camera control unit 12 reads out a computer program stored in a storage unit 13 and executes it. At this time, the camera control unit 12 communicates various kinds of control signals, data, and the like with the lens control unit 104 via a communication terminal of an electric contact 105 provided to a lens mount 102. The electric contact 105 includes a power supply terminal that supplies power from the above-described power supply unit 10 to the interchangeable lens 101.

The imaging optical system included in the interchangeable lens 101 includes a focus group 201, which includes a focus lens that realizes a focus adjustment by moving in the optical-axis direction, a diaphragm group 401, which performs a light amount adjustment operation, and an image stabilization group 501, which includes a shift lens as an image stabilization element for reducing an image shake. The image stabilization group 501 performs an image stabilization operation of reducing the image shake by causing the shift lens to move (shift) in the Z/Y-axis directions perpendicular to the optical axis. Further, the interchangeable lens 101 includes a focus driving unit 301, which drives the focus group 201, a diaphragm driving unit 402, which drives the diaphragm group 401, and an image stabilization driving unit 502, which drives the image stabilization group 501.

The camera main body 1 includes a shutter unit 14, a shutter driving unit 15, an image sensor 16, an image processing unit 17, and the above-described camera control unit 12. The shutter unit 14 controls an amount of light used for an exposure by the image sensor 16. The image sensor 16 photoelectrically converts a subject image formed by the imaging optical system, and outputs an imaging signal. The image processing unit 17 generates an image signal after performing various kinds of image processing on the imaging signal. The display unit 9 displays, for example, the image signal output from the image processing unit 17, displays the imaging parameters as described above, and presents the playback display of the captured image recorded in the storage unit 13 or a not-illustrated recording medium.

The camera control unit 12 controls driving of the focus group 201 based on the imaging preparation operation on the operation unit 11 (the half-pressing operation of the release button 5). For example, when an instruction for the automatic focus operation is issued, a focus detection unit 18 determines a focus state of the subject image formed on the image sensor 16 based on the image signal generated by the image processing unit 17, and generates a focus signal to transmit it to the camera control unit 12. At the same time, the focus driving unit 301 detects a current position of the focus group 201 and transmits a signal thereof to the camera control unit 12 via the lens control unit 104. The camera control unit 12 compares the focus state of the subject image and the current position of the focus group 201, and calculates a focus driving amount based on a difference amount therebetween and transmits it to the lens control unit 104. Then, the lens control unit 104 controls the driving of the focus group 201 to a target position via the focus driving unit 301, thereby correcting defocus of the subject image.

As will be described below in detail, the focus driving unit 301 includes a cam barrel, a focus motor, a speed reduction gear that couples the cam barrel and the focus motor, and a photointerrupter that detects an original position of the focus group 201. Generally, a stepping motor, which is one type of actuator, is mostly employed as the focus motor. However, the stepping motor can control only a relative driving amount, and leads to instability of the position of the focus group 201 in the powered-off state. Therefore, the stepping motor necessitates control of moving the focus group 201 to the original position and performing original position detection processing before the imaging operation starts. A known technique is usable for the control of the original position detection processing. A direct-current (DC) motor or an ultrasonic motor including an encoder can be employed as the actuator. The photointerrupter directly receives light emitted from a light emission unit by a light reception unit, and can be replaced with a photoreflector that receives light reflected from a reflection surface or with a brush in contact with a conductive pattern.

The camera control unit 12 controls driving of the diaphragm group 401 and the shutter unit 14 via the diaphragm driving unit 402 and the shutter driving unit 15 according to the setting values of the aperture value and the shutter speed received from the operation unit 11. For example, when an instruction for the automatic exposure control operation is issued, the camera control unit 12 receives a luminance signal generated by the image processing unit 17 and carries out a photometry calculation. The camera control unit 12 controls the driving of the diaphragm group 401 based on the result of the photometry calculation in response to an imaging instruction operation on the operation unit 11 (the fully-pressing operation of the release button 5). Along therewith, the camera control unit 12 controls driving of the shutter unit 14 via the shutter driving unit 15, thereby performing exposure processing by the image sensor 16.

The camera main body 1 includes a pitch shake detection unit 19 and a yaw shake detection unit 20 as a shake detection unit capable of detecting an image shake such as a camera shake caused by the user. The pitch shake detection unit 19 and the yaw shake detection unit 20 detect image shakes in the pitch direction (the rotational direction around the Z axis) and the yaw direction (the rotational direction around the Y axis) using an angular speed sensor (a vibration gyroscope) and an angular acceleration sensor, and output shake signals, respectively. The camera control unit 12 calculates a shift position of the image stabilization group 501 (the shift lens) in the Y-axis direction using the shake signal from the pitch shake detection unit 19. Similarly, the camera control unit 12 calculates a shift position of the image stabilization group 501 in the Z-axis direction using the shake signal from the yaw shake detection unit 20. Then, the camera control unit 12 controls driving of the image stabilization group 501 to a target position based on the calculated shift positions in the pitch/yaw directions, thereby performing the image stabilization operation for reducing an image shake during the exposure or while the through-the-lens image is displayed.

Figure 3:
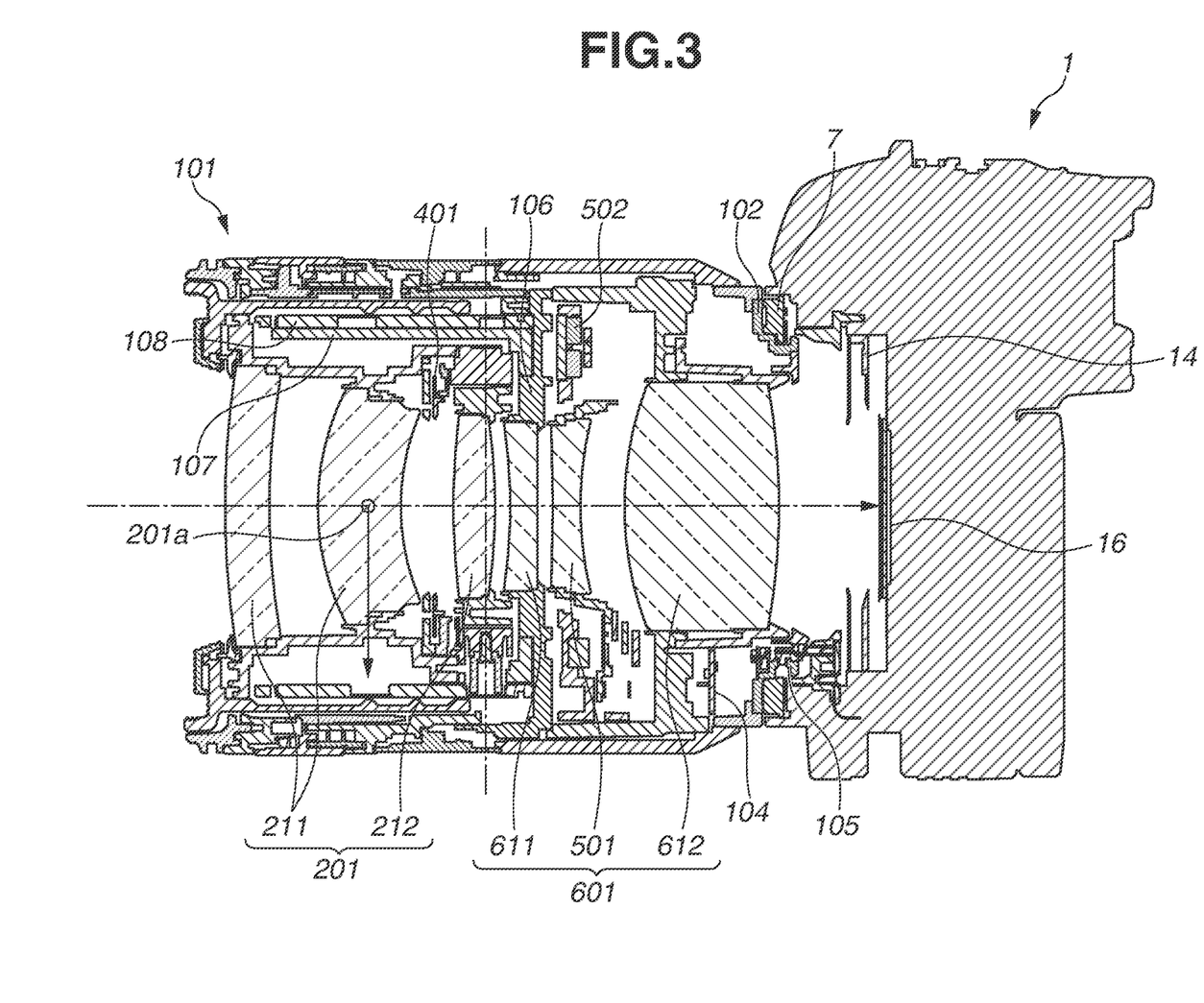
FIG. 3 is a cross-sectional view of the interchangeable lens (a retracted state) according to the exemplary embodiment of the disclosure.
Figure 4:
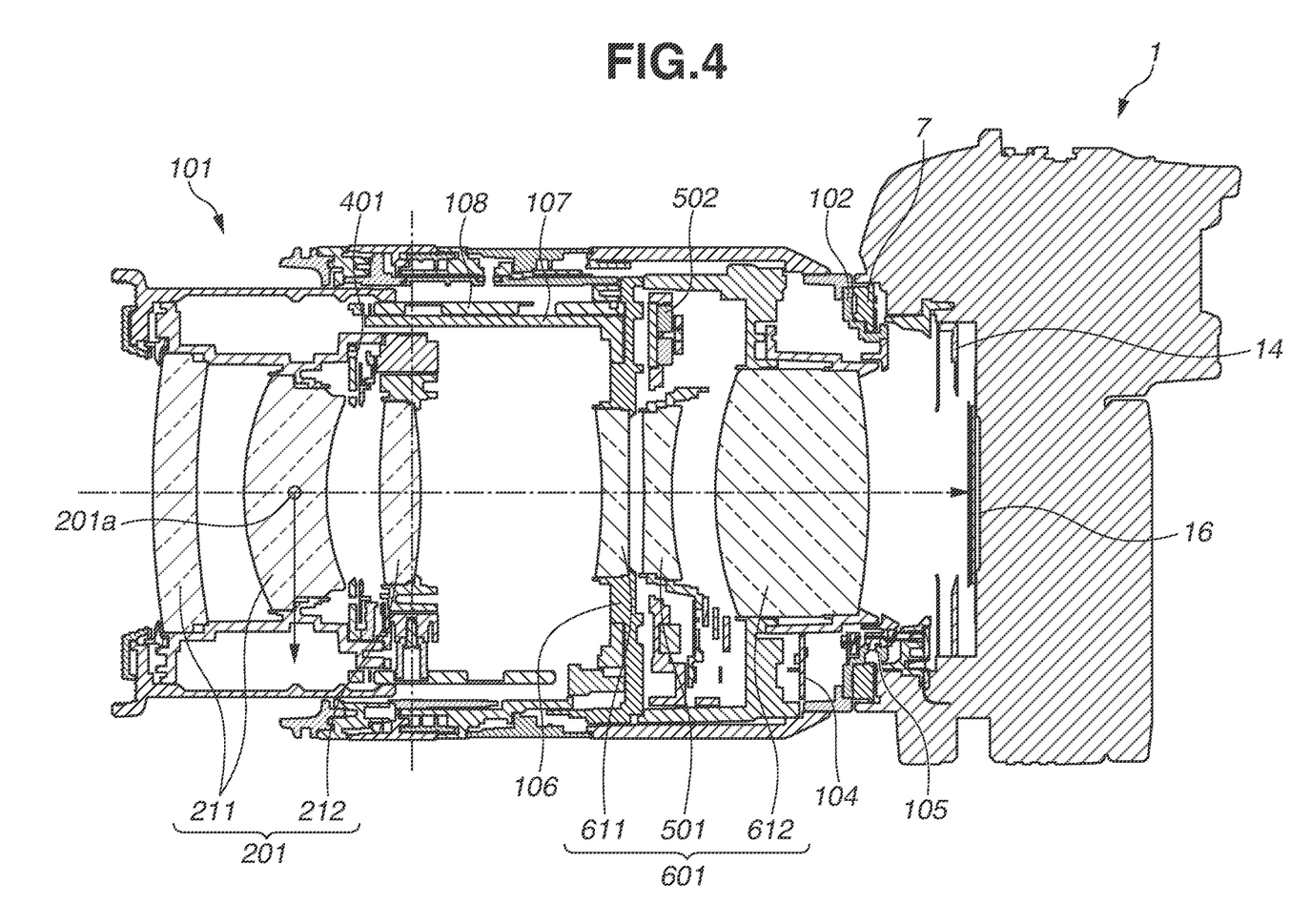
FIG. 4 is a cross-sectional view of the interchangeable lens (an extended state) according to the exemplary embodiment of the disclosure.

A positional relationship among constituent components in the camera system constructed by mounting the interchangeable lens 101 onto the camera main body 1 will be described. FIG. 3 is a cross-sectional view of the interchangeable lens 101 in a retracted state according to the present exemplary embodiment, and FIG. 4 is a cross-sectional view of the interchangeable lens 101 in an extended state according to the present exemplary embodiment. FIGS. 3 and 4 illustrate the cross-sectional views taken along an X-Y plane. Each of central lines illustrated in FIGS. 3 and 4 is located on the same position as the optical axis of the optical system.

The present exemplary embodiment employs a two-group structure formed by the focus group 201 including a first focus lens 211 and a second focus lens (an adjustment lens) 212 and a fixed group 601 including a first fixed lens 611 and a second fixed lens 612 as an example of the imaging optical system. The focus group 201, which has been moved to a predetermined optical position according to the defocus of the subject image, images the light from the subject on an imaging plane of the image sensor 16 via the fixed group 601. At the time of the image formation, the diaphragm group 401 is held in the focus group 201 together with the first focus lens 211 and the second focus lens (the adjustment lens) 212, and moves integrally with the focus group 201. On the other hand, the image stabilization group 501 is disposed between the first fixed lens 611 and the second fixed lens 612, and functions as a part of the fixed group 601.

The imaging optical system according to the present exemplary embodiment further includes an adjustment mechanism that arranges the second focus lens (the adjustment lens) 212 at a displaced position. The provision of this adjustment mechanism allows a worker to assemble the imaging optical system so as to reduce, for example, a manufacturing error and an assembling variation that might be caused in each constituent component while checking a state of optical performance as a whole during an assembling process.

In the following description, the focus driving mechanism according to the present exemplary embodiment will be described in detail.

Figure 5A:
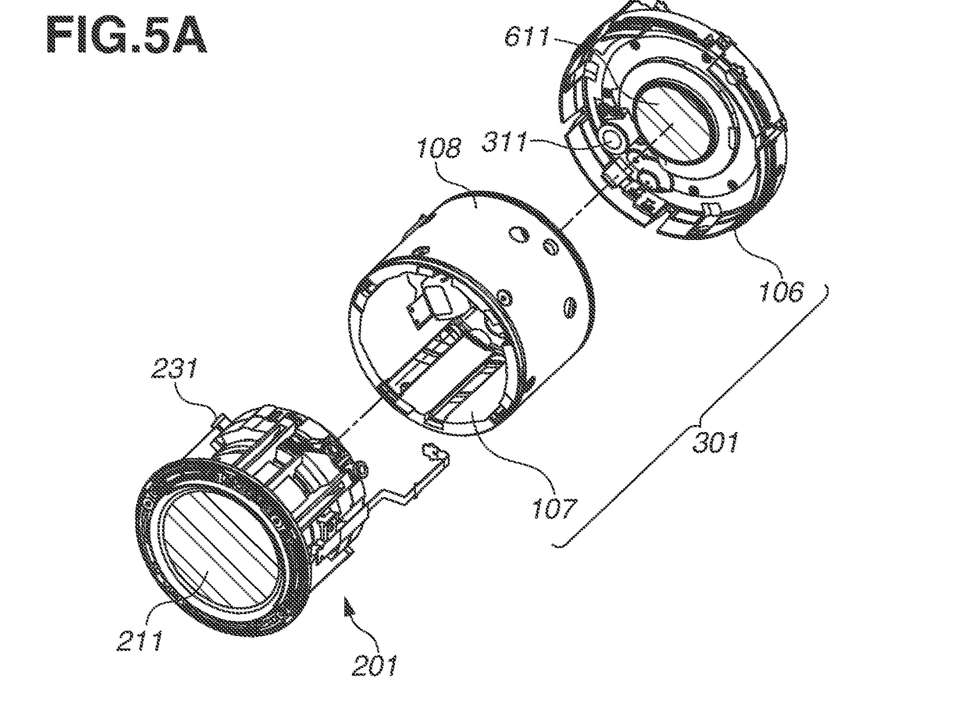
FIG. 5A is a front perspective view of an exploded focus driving mechanism according to the exemplary embodiment of the disclosure.
Figure 5B:
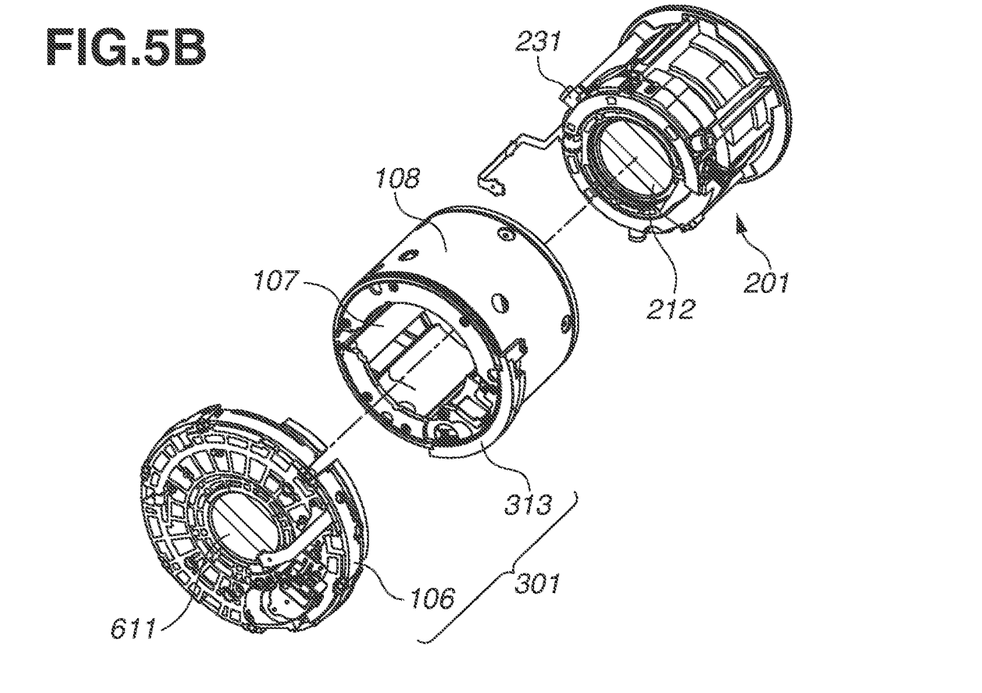
FIG. 5B is a back perspective view of the exploded focus driving mechanism according to the exemplary embodiment of the disclosure.
Figure 6:
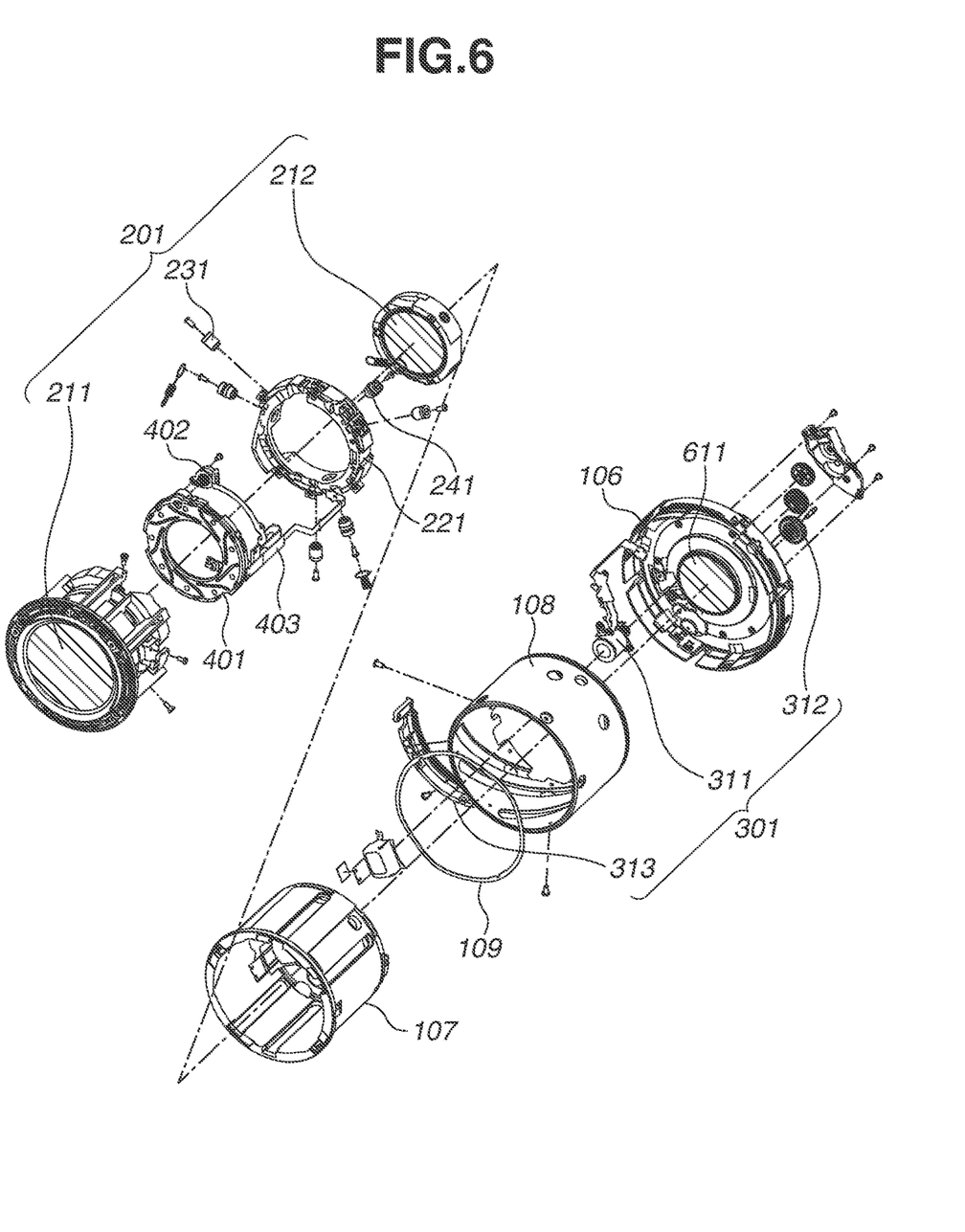
FIG. 6 is a front perspective view of the exploded focus driving mechanism according to the exemplary embodiment of the disclosure.

FIGS. 5A and 5B illustrate the focus group 201 and the focus driving unit 301 according to the present exemplary embodiment as viewed from the diagonally front side and the diagonally back side, respectively. FIG. 6 is an exploded view of the focus group 201 and the focus driving unit 301 according to the present exemplary embodiment.

A fixation barrel 106 is a fixation member that holds the first fixed lens 611 on the inner peripheral side thereof and holds a straight movement guide barrel 107 on the surface thereof on the front side. The straight movement guide barrel 107 is a fixation member that holds the focus group 201 on an inner peripheral side thereof and rotatably holds a cam barrel 108 on an outer peripheral side thereof. The cam barrel 108 is biased in the optical-axis direction by an elastic member 109, and a surface thereof on the back side (one side thereof closer to the camera main body 1) is slidably in close contact with the fixation barrel 106.

A focus motor 311 is fixed relative to a surface of the fixation barrel 106 on the front side in such a manner that a rotational axis of the focus motor 311 extends in parallel with the optical axis. On the other hand, the speed reduction gear 312 includes a plurality of gears, and each of them is held rotatably relative to a surface of the fixation barrel 106 on the back side. Further, a cam barrel gear 313 is fixed relative to an outer peripheral surface of the cam barrel 108 so as to be coupled with the speed reduction gear 312. When the focus motor 311 is rotationally driven, a driving force of the focus motor 311 slows down via the speed reduction gear 312 and the cam barrel gear 313, and is transmitted to the cam barrel 108. In this manner, the cam barrel 108 rotates around the optical axis while being kept in a state restricted from moving in the optical-axis direction.

The focus group 201 is mounted by being inserted from the front side onto the inner peripheral side of the straight movement guide barrel 107. Straight movement grooves, which restrict a movement of the focus group 201 in the rotational direction and guide a straight movement thereof in the optical-axis direction, are formed on the straight movement guide barrel 107. The straight movement grooves are formed by three through grooves corresponding to phases of movement rollers 231, and all these through grooves have equal groove widths. Cam grooves, which have linear tracks in the rotational direction in correspondence with a stroke of the focus group 201, are formed on the cam barrel 108. The cam grooves are formed by three non-through bottomed grooves corresponding to the phases of the movement rollers 231, and all these bottomed grooves have the same cam tracks and equal groove widths and groove depths. Three movement rollers 231, each of which includes a fixed portion and a fitted portion having centers coaxial with each other, are fixed to the focus group 201 at intervals of equally divided 120 degrees, and are fitted to each of the straight movement grooves and the cam grooves with slight clearances formed therebetween. When the cam barrel 108 rotates, the movement rollers 231 allow the focus group 201 to move forward and backward in the optical-axis direction along the cam tracks of the cam grooves due to the fitted engagement with the straight movement grooves and the cam grooves. From the above description, it can be understood that the movement rollers 231 are coaxial rollers.

The focus group 201 includes the first focus lens 211, the diaphragm group 401, a movement barrel 221, and the second focus lens (the adjustment lens) 212. The second focus lens (the adjustment lens) 212 is held on the inner peripheral side of the movement barrel 221 via adjustment rollers 241, which are an adjustment mechanism. The movement rollers 231 are fixed by screws relative to an outer peripheral surface of the movement barrel 221 in a direction perpendicular to the optical axis. The diaphragm driving unit (a diaphragm motor) 402 is electrically connected to the diaphragm group 401 via a flexible printed wiring board 403. A movable bent portion is formed on the flexible printed wiring board 403 between an inner peripheral surface of the straight movement guide barrel 107 and the outer peripheral surface of the movement barrel 221, and the diaphragm group 401 is configured integrally movably with the focus group 201.

Figure 7:
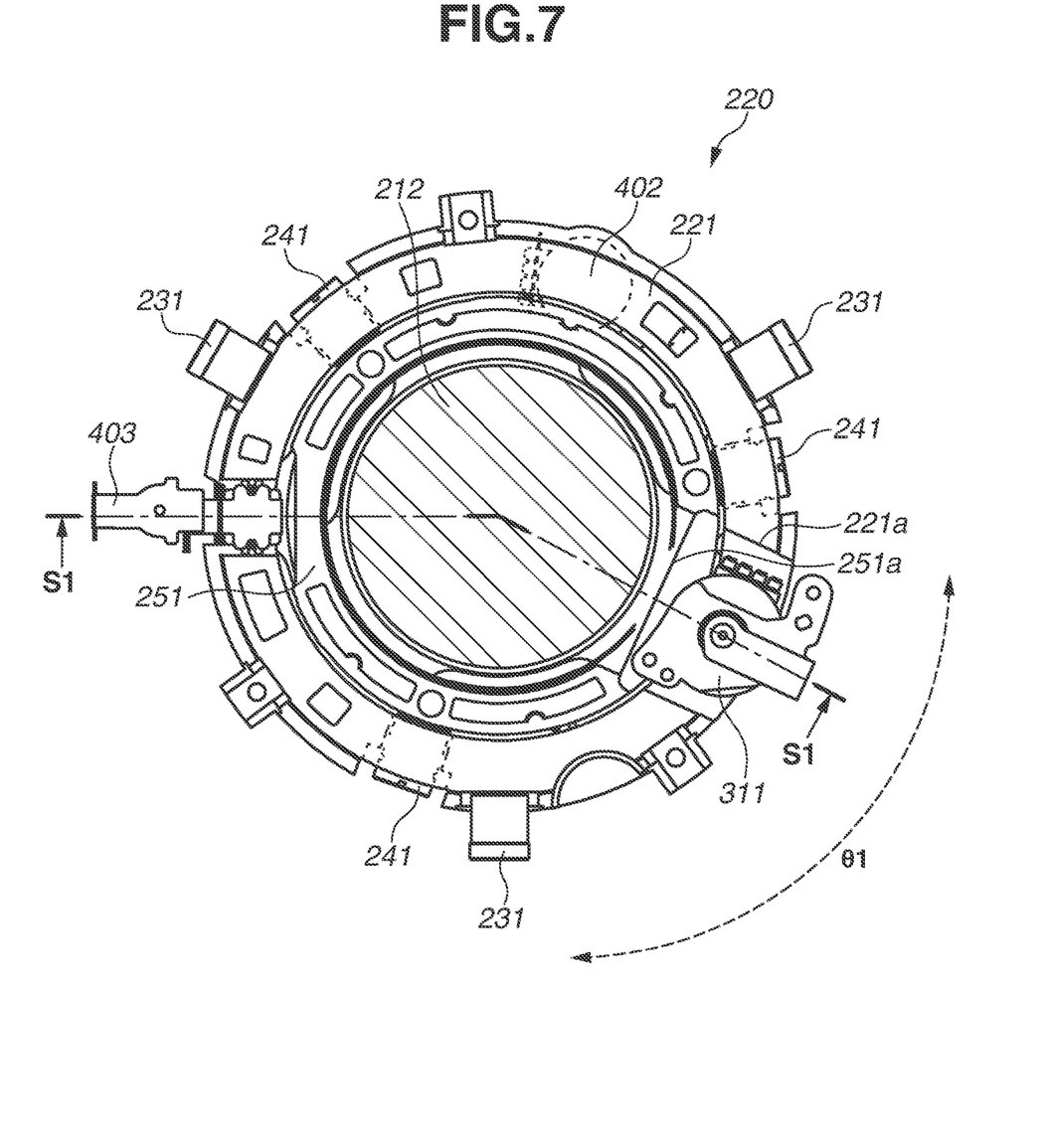
FIG. 7 is a back view of a movement barrel unit and a focus motor according to the exemplary embodiment of the disclosure.
Figure 8:
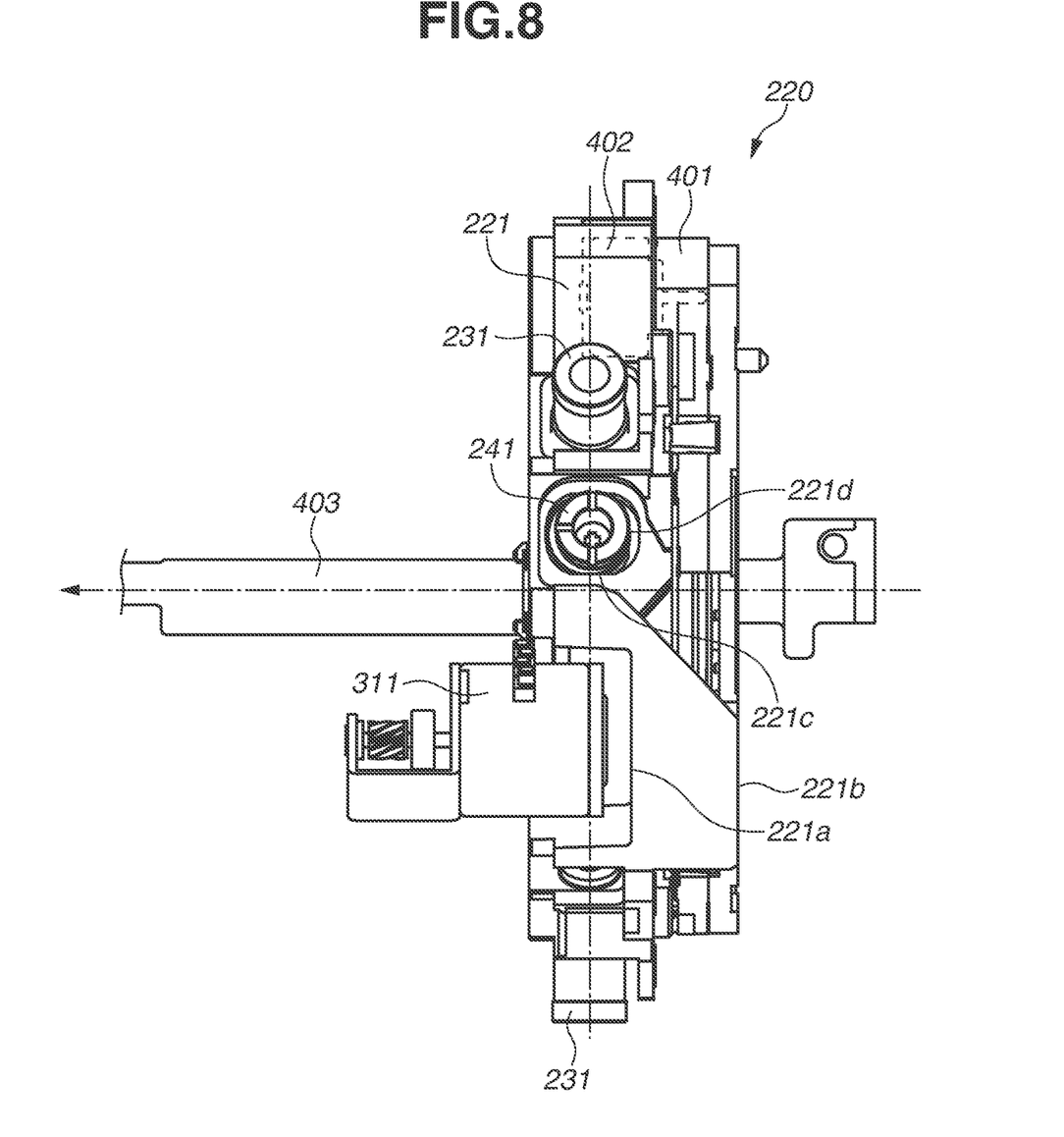
FIG. 8 is a side view of the movement barrel unit and the focus motor (the retracted state) according to the exemplary embodiment of the disclosure.
Figure 9:
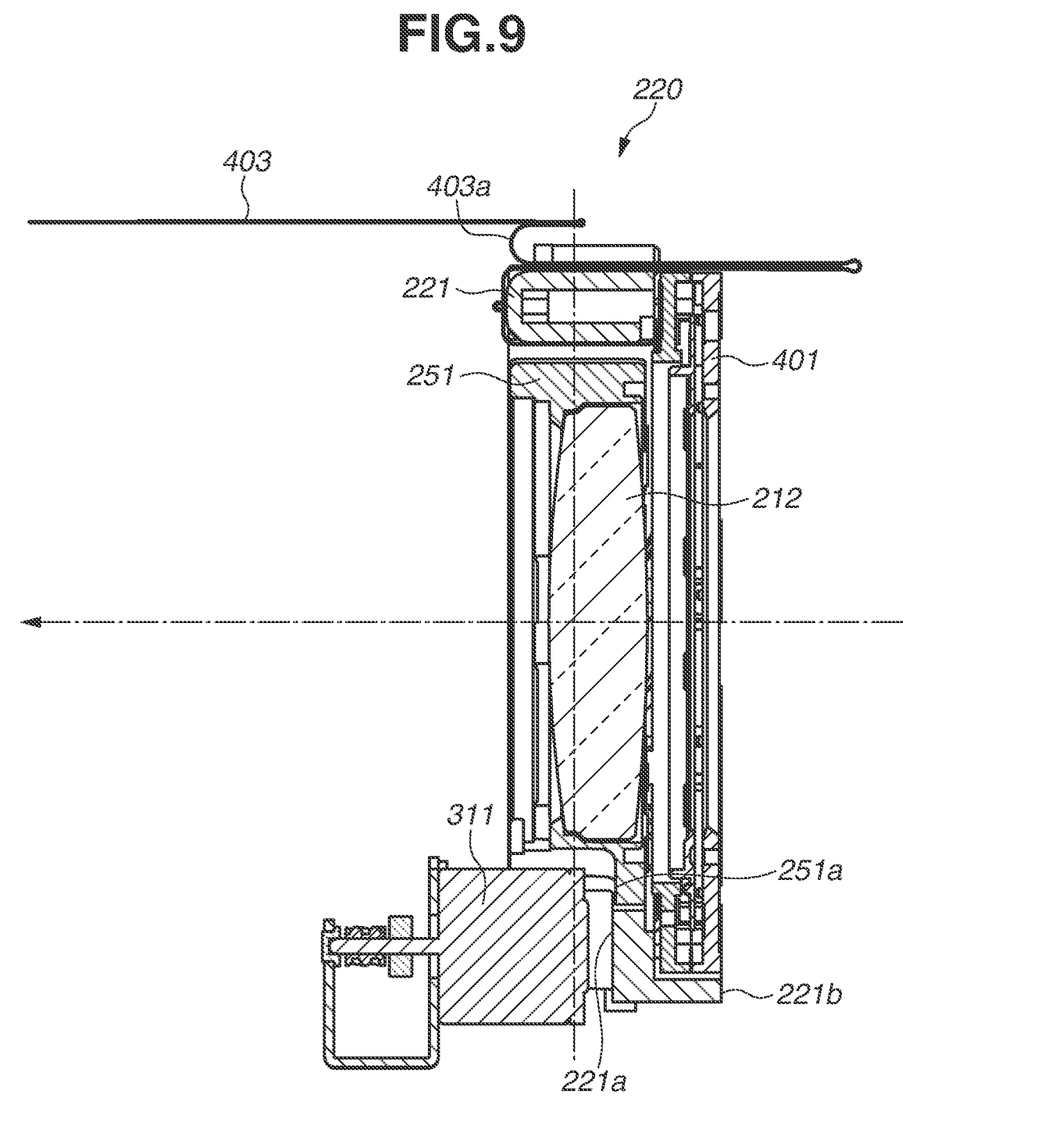
FIG. 9 is a cross-sectional view of the movement barrel unit and the focus motor according to the exemplary embodiment of the disclosure.

The configuration of a movement barrel unit 220 will be described in detail. FIG. 7 is a back view of the movement barrel unit 220 and the focus motor 311 according to the present exemplary embodiment. In FIG. 7, a part of the constituent components is omitted. FIG. 8 is a side view of the movement barrel unit 220 and the focus motor 311 in the retracted state according to the present exemplary embodiment. FIG. 9 is a cross-sectional view of the movement barrel unit 220 and the focus motor 311 according to the present exemplary embodiment. The focus group 201 in FIG. 9 is in a maximally retracted state.

The movement barrel unit 220 includes an adjustment lens holding frame 251, which holds the second focus lens (the adjustment lens) 212, and the movement barrel 221. The movement barrel 221 is disposed on the inner peripheral side of the straight movement guide barrel 107, and has a substantially cylindrical shape extending along an inner diameter of the straight movement guide barrel 107. Similarly, the adjustment holding frame 251 is held on the inner peripheral side of the movement barrel 221, and has a substantially cylindrical shape extending along an inner diameter of the movement barrel 221. A clearance larger than the maximum value of the movement amount required of the second focus lens (the adjustment lens) 212 is prepared between the movement barrel 221 and the adjustment holding frame 251 so as to be able to adjust the adjustment lens holding frame 251 by an arbitrary movement amount. Three adjustment holes penetrating through from the outer periphery to the inner periphery are formed through a side surface of the movement barrel 221. As each of the adjustment holes, a straight movement groove 221c, which has a longitudinal direction extending in the optical-axis direction, and a circumferential groove 221d, which has a longitudinal direction extending in the circumferential direction perpendicular to the optical-axis direction, make a coaxially arranged combination pair, and are evenly disposed at three portions at intervals of 120 degrees in the circumferential direction.

The adjustment rollers 241 each include a fixed portion to be fixed relative to the adjustment lens holding frame 251, a coaxial portion having a center coaxial with the fixed portion, and an eccentric portion having a center eccentric at a position offset from the fixed portion. In other words, the adjustment rollers 241 are eccentric rollers. The adjustment rollers 241 are fitted to the adjustment holes formed on the side surface of the movement barrel 221, and are fixed relative to the adjustment lens holding frame 251 using screws. The adjustment rollers 241 are each provided with a slotted portion, and can be rotated by being engaged with a tool. This makes it possible to move the entire adjustment lens holding frame 251 to achieve a desired adjustment state by rotating the adjustment rollers 241 while checking a state of the optical performance such as a projection at the stage of, for example, finishing assembling the movement barrel unit 220.

The adjustment lens holding frame 251 is configured in such a manner that the position thereof in a radial direction is determined relative to the movement barrel 221 due to the fitted engagement between the eccentric portions and the straight movement grooves 221c. On the other hand, the position of the adjustment lens holding frame 251 in the optical-axis direction is determined relative to the movement barrel 221 due to the fitted engagement between the coaxial portions and the circumferential grooves 221d. As described above, when the adjustment rollers 241 are rotated, the adjustment lens holding frame 251 is adjusted in a direction decentered in parallel with respect to the optical axis because the movement in the optical-axis direction is restricted due to the fitted engagement between the coaxial portions and the circumferential grooves 221d. In this manner, the adjustment rollers 241 allow the decentering adjustment to be made to the second focus lens (the adjustment lens) 212. The present exemplary embodiment has been described regarding the decentering adjustment, which is an example of the positional adjustment of the lens, but, besides it, the disclosure can be applied to a tilt adjustment of adjusting a tilt of a lens and a thrust adjustment of adjusting an interval between lenses.

As illustrated in FIGS. 5A, 5B and 6, the focus motor 311 is fixed to a region radially outside an outer diameter of the first fixed lens 611. Further, the focus motor 311 is disposed inside an inner diameter of the cam barrel 108 so as not to enter a space in which the cam barrel 108 rotationally operates. Similarly, the movement rollers 231 and the adjustment rollers 241 are disposed in a region radially outside an outer diameter of the second focus lens (the adjustment lens) 212 and radially inside the inner diameter of the cam barrel 108. As illustrated in FIG. 7, the focus motor 311, the movement rollers 231, and the adjustment rollers 241 are arranged at different phases so as not to overlap one another circumferentially. As a result, the limited space inside the inner diameter of the cam barrel 108 can be efficiently utilized in the layout of the constituent components of the focus group 201 and the focus motor 311.

When the cam barrel 108 is rotationally driven in a direction for extending the focus group 201, the focus group 201 is separated from the focus motor 311. Conversely, when the cam barrel 108 is rotationally driven in a direction for retracting the focus group 201, the focus group 201 approaches the focus motor 311. As illustrated in FIGS. 8 and 9, the movement barrel unit 220 and the focus motor 311 overlap each other in the optical-axis direction in a state that the focus group 201 is maximally retracted. In the state that the focus group 201 is maximally retracted, the focus motor 311 is held in a recessed portion 221a formed on the movement barrel 221 and a recessed portion 251a formed on the adjustment lens holding frame 251. When the focus motor 311 is held in the recessed portion 221a and the recessed portion 251a, the entire length of the product is shortened. Further, a part of the engine portion serving as a source of generating a vibration of the focus motor 311 can be covered and hidden by the recessed portion 221a of the movement barrel 221 and the recessed portion 251a of the adjustment lens holding frame 251. As far as the retracted state goes, the present configuration can be expected to bring about a beneficial effect of reducing noise from the focus motor 311 by surrounding the focus motor 311 by the recessed portion 221a and the recessed portion 251a.

As illustrated in FIG. 7, the recessed portion 251a formed on the adjustment lens holding frame 251 has a larger space than the recessed portion 221a formed on the movement barrel 221. This arrangement is made for the purpose of configuring the movement barrel unit 220 not to cause interference between the adjustment lens holding frame 251 and the focus motor 311 even when the second focus lens (the adjustment lens) 212 moves to the maximum value. Further, a protrusion portion 221b is formed on a front side of the movement barrel 221 corresponding to the recessed portion 221a formed on a back side thereof. The protrusion portion 221b is provided to compensate for rigidity of the movement barrel 221, which is reduced due to the formation of the recessed portion 221a.

A region θ1 illustrated in FIG. 7 indicates a range of approximately 90 degrees, which corresponds to a region located on a lower side in the vertical direction and on a side of the grip portion 2 of the camera main body 1 in the horizontal direction. Generally, a microphone built in the camera main body 1 is disposed on an upper side in the vertical direction. An external microphone mounted via the accessory shoe 6 is also mostly disposed on the upper side in the vertical direction. Placing the focus motor 311 on the lower side in the vertical direction allows the focus motor 311 and the microphone to be separated away from each other, thereby making it difficult to transmit noise caused by, for example, the vibration of the focus motor 311 and the meshed engagement between the focus motor 311 and the speed reduction gear 312, to the microphone.

During normal imaging by the camera main body 1 held with a hand of a user, the user holds the grip portion 2 of the camera main body 1 with his/her hand, and therefore the interchangeable lens 101 and the user's hand are in a state located close to each other. Conversely, no obstacle exists at one of the both ends of the camera main body 1 that is located on the opposite side of the optical axis from the grip portion 2. In comparison between the both sides in the horizontal direction in terms of noise propagated via air, the noise is relatively less transmittable on the side of the grip portion 2 of the camera main body 1 than on the opposite side from the grip portion 2. In other words, a configuration beneficial for a reduction in the noise can be achieved by placing the focus motor 311 on the side of the grip portion 2 of the camera main body 1 in the horizontal direction. For the above-described reasons, the camera main body 1 is configured in such a manner that the focus motor 311 is disposed in the region θ1 located on the lower side in the vertical direction in the present exemplary embodiment.

The diaphragm driving unit (the diaphragm motor) 402 is disposed in a region radially outside the outer diameter of the second focus lens (the adjustment lens) 212 and radially inside the inner diameter of the cam barrel 108. The flexible printed wiring board 403 is connected to the diaphragm driving unit (the diaphragm motor) 402, and forms a movable bent portion 403a between the diaphragm driving unit 402 and the straight movement guide barrel 107. As illustrated in FIG. 7, the movement rollers 231, the adjustment rollers 241, the focus motor 311, the diaphragm driving unit (the diaphragm motor) 402, and the movable bent portion 403a are arranged at different phases so as not to overlap one another circumferentially.

As illustrated in FIG. 8, a plane in which the movement rollers 231 and the adjustment rollers 241 are arranged overlaps a part of the focus motor 311 and the diaphragm driving unit (the diaphragm motor) 402 in the optical-axis direction. Similarly, as illustrated in FIG. 9, the plane in which the movement rollers 231 and the adjustment rollers 241 are arranged also overlaps a part of the focus motor 311, the movable bent portion 403a, and the second focus lens (the adjustment lens) 212 in the optical-axis direction. In this manner, the constituent components are efficiently arranged in the limited space inside the inner diameter of the cam barrel 108, which makes it possible to achieve a further reduction in the entire length of the product.

Generally, the cam barrel 108 and the movement rollers 231 are manufactured by cutting metallic materials resistant to distortion, such as aluminum and brass. A benefit of employing such metallic materials is that the metallic materials allow the cam barrel 108 and the movement rollers 231 to be finished up with high precision due to the cutting processing, and are less deformable even under various environmental temperatures and imaging orientations. On the other hand, when low-toughness metallic materials are fitted to each other, press-fitting is difficult, and therefore clearance-fitting, in which a slight clearance is generated, is also employed for them.

In the present exemplary embodiment, the slight clearances are also generated between the cam grooves formed on the cam barrel 108 and the movement rollers 231. A center of gravity 201a of the focus group 201 is located on the front side with respect to the movement rollers 231, and therefore the focus group 201 is pulled by its own weight into such an orientation that an front end thereof is slightly tilted vertically downward with the movement rollers 231 serving as supporting points therefor at the time of imaging. Therefore, the worker conducts the decentering adjustment of the second focus lens (the adjustment lens) 212 by engaging the tool with the adjustment rollers 241 to rotate them so as to be able to achieve the desired optical performance based on the slightly tilted orientation as a practical reference therefor when conducting the optical adjustment. If the worker presses the tool against the adjustment rollers 241 when conducting the optical adjustment, a moment of a force is unintentionally generated due to the separation of the adjustment rollers 241 serving as force application points from the movement rollers 231 serving as the supporting points. Therefore, when the clearances are generated between the cam grooves and the movement rollers 231, this undesirably leads to such a phenomenon that the front end of the focus group 201 is accidentally tilted temporarily in a different direction from the lower side in the vertical direction. In this manner, the direction and the amount of the tilt of the focus group 201 vary between the state in which an external force is temporarily applied during the optical adjustment and a state in which no external force is applied after the optical adjustment, so that the tool cannot be strongly pressed against the adjustment rollers 241. Further, this situation undesirably makes the work complicated, such as requiring the worker to continue the above-described adjustment while checking a result in the state that no external force is applied by, for example, separating the tool from the adjustment rollers 241 from time to time.

To address such inconvenience, the present exemplary embodiment employs such a layout where the centers of the adjustment rollers 241 are located in substantially the same plane as the centers of the movement rollers 231. This aims to position the centers of the adjustment rollers 241 serving as the force application points closer to the centers of the movement rollers 231 serving as the supporting points with the aid of such a layout, and makes it difficult to generate a moment of a force even when a strong external force is applied to the adjustment rollers 241 when the optical adjustment is conducted. Therefore, deterioration of the workability like the above-described example can be avoided even when the clearances are generated between the cam grooves and the movement rollers 231.

Generally, a lens barrel component like the movement barrel 221 is made of a resin material such as polycarbonate, and can be manufactured with low cost using injection molding but is highly thermally expandable and less rigid compared to a metallic material. To address such inconvenience, the present exemplary embodiment prevents a positional misalignment in the optical-axis direction between the movement rollers 231 and the adjustment rollers 241 due to a change in the environmental temperature by arranging the centers of the movement rollers 231 and the centers of the adjustment rollers 241 in substantially the same plane. Similarly, the present exemplary embodiment establishes a configuration that reduces distortion of the movement barrel 221 due to an influence of the own weight of the second focus lens (the adjustment lens) 212, and avoids deterioration of the optical performance along with, for example, a change in the imaging orientation by arranging the centers of the movement rollers 231 and the centers of the adjustment rollers 241 in substantially the same plane.

Other Exemplary Embodiments

The above-described exemplary embodiment is merely a representative example, and can be modified or changed in various manners when the disclosure is implemented.

According to the configuration of the aspect of the embodiment, it is possible to realize miniaturization of the optical apparatus by disposing the actuator on the inner peripheral side of the cam barrel. Further, it is possible to stably adjust the lens that moves by arranging a movement unit and an adjustment unit to overlap each other in the optical-axis direction.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-024749, filed Feb. 17, 2020, which is hereby incorporated by reference herein in its entirety.

What is claimed is:

1. An apparatus comprising:
a lens group including a first lens and a second lens;
a cam barrel;
an actuator disposed on an inner peripheral side of the cam barrel and configured to rotate the cam barrel around an optical axis;
movement rollers disposed on the inner peripheral side of the cam barrel and configured to move the lens group in an optical-axis direction as the cam barrel rotates; and
adjustment rollers disposed on the inner peripheral side of the cam barrel and configured to adjust a position of the second lens,
wherein the movement rollers, the adjustment rollers, and the actuator are arranged at different phases from one another in a circumferential direction of the cam barrel, and
wherein, viewed from a direction perpendicular to the optical-axis, the movement rollers, the adjustment rollers, and the actuator are disposed across a same plane.

2. The apparatus according to claim 1, wherein the actuator is a focus motor configured to rotationally drive the cam barrel.

3. The apparatus according to claim 1, further comprising an accessory shoe.

4. The apparatus according to claim 1, further comprising a grip portion,
wherein the actuator is disposed at one of two ends of the apparatus that is located closer to the grip portion.

5. The apparatus according to claim 1, wherein the movement rollers are fitted to the cam barrel.

6. The apparatus according to claim 1, further comprising:
a lens holding frame configured to hold the lens group; and
a movement barrel configured to hold the lens holding frame,
wherein a clearance is generated between the lens holding frame and the movement barrel.

7. The apparatus according to claim 6, wherein the movement barrel holds the lens holding frame via the adjustment rollers.

8. The apparatus according to claim 6, wherein the lens holding frame and the movement barrel each include a recessed portion for housing the actuator.

9. The apparatus according to claim 8, wherein the recessed portion of the lens holding frame has a larger space in which the actuator can be held than the recessed portion of the movement barrel.

10. The apparatus according to claim 8, wherein the movement barrel further includes a protrusion portion.

11. The apparatus according to claim 1, wherein the actuator includes at least a diaphragm motor configured to drive a diaphragm group that adjusts a light amount entering the lens group.

12. The apparatus according to claim 1, further comprising a movable bent portion,
wherein the movement rollers, the adjustment rollers, the actuator, and the movable bent portion are arranged at different phases from one another in the circumferential direction, and
wherein widths of the movement rollers, the adjustment rollers, the actuator, and the movable bent portion in the optical-axis direction overlap one another.

13. The apparatus according to claim 1, wherein the movement rollers are coaxial rollers and the adjustment rollers are eccentric rollers.

14. The apparatus according to claim 1, wherein the cam barrel and the movement rollers are made of metallic materials.

15. The apparatus according to claim 1, wherein a clearance is generated between the cam barrel and the movement rollers.

16. A system comprising:
an apparatus; and
a sensor,
wherein the apparatus includes
a lens group including a first lens and a second lens,
a cam barrel,
an actuator disposed on an inner peripheral side of the cam barrel, movement rollers disposed on the inner peripheral side of the cam barrel and configured to move the lens group in an optical-axis direction as the cam barrel rotates, and adjustment rollers disposed on the inner peripheral side of the cam barrel and configured to adjust a position of the second lens, wherein the movement rollers, the adjustment rollers, and the actuator are arranged at different phases from one another in a circumferential direction of the cam barrel, and wherein, viewed from a direction perpendicular to the optical-axis, the movement rollers, the adjustment rollers, and the actuator are disposed across a same plane.

17. The system according to claim 16, wherein the actuator is a focus motor configured to rotationally drive the cam barrel.

18. The system according to claim 16, further comprising an accessory shoe.

19. The system according to claim 16, further comprising a grip portion, wherein the actuator is disposed at one of two ends of the apparatus that is located closer to the grip portion.

20. The system according to claim 16, wherein the movement rollers are fitted to the cam barrel.

* * * * *